United States Patent [19]
Stava et al.

[11] Patent Number: 5,742,029
[45] Date of Patent: Apr. 21, 1998

[54] METHOD OF WELDING WALLPAPER ALLOY AN ARC WELDER MODIFIED TO PRACTICE SAME

[75] Inventors: Elliott K. Stava, Sagamore Hills; Peter L. Nicholson, Euclid, both of Ohio

[73] Assignee: The Lincoln Electric Company, Cleveland, Ohio

[21] Appl. No.: 679,899

[22] Filed: Jul. 15, 1996

[51] Int. Cl.$^6$ .................................................. B23K 9/10
[52] U.S. Cl. ............................ 219/137 PS; 219/130.31
[58] Field of Search ........................ 219/137 PS, 130.21, 219/130.31

[56] References Cited

U.S. PATENT DOCUMENTS

| | | |
|---|---|---|
| 4,639,576 | 1/1987 | Shoemaker . |
| 4,954,691 | 9/1990 | Parks et al. .................. 219/137 PS |
| 4,993,621 | 2/1991 | Koy . |
| 5,001,326 | 3/1991 | Stava . |
| 5,054,980 | 10/1991 | Bidefeld . |
| 5,148,001 | 9/1992 | Stava . |
| 5,494,614 | 2/1996 | Gohara . |

OTHER PUBLICATIONS

Brochure "Welding Journal—New Power Sources Cut Spatter, Fumes" Published by the American Welding Society.

*Primary Examiner*—Clifford C. Shaw
*Attorney, Agent, or Firm*—Vickers, Daniels & Young

[57] ABSTRACT

A method of and welder for welding a corrosion resistant, wallpaper alloy to the inside surface of a vessel wall formed from a corrosion susceptible steel sheet after the wallpaper alloy has been affixed to the inside to provide an exposed seam of wallpaper alloy extending in a given path wherein the method and welder comprising moving a welding wire toward the seam, melting and depositing the welding wire onto the seam along the path by a short circuit arc welding process of the type having a welding cycle with a short condition and an arcing condition, which arcing condition constitutes a plasma boost portion with a set peak current level followed by a plasma portion with a current decreasing from said peak current level toward a set background current level with a given time between the plasma boost portion and the short condition andsetting the length of time of the plasma portion of the arcing condition to a value greater than 25% of the given time or greater than 2.0 ms.

58 Claims, 9 Drawing Sheets

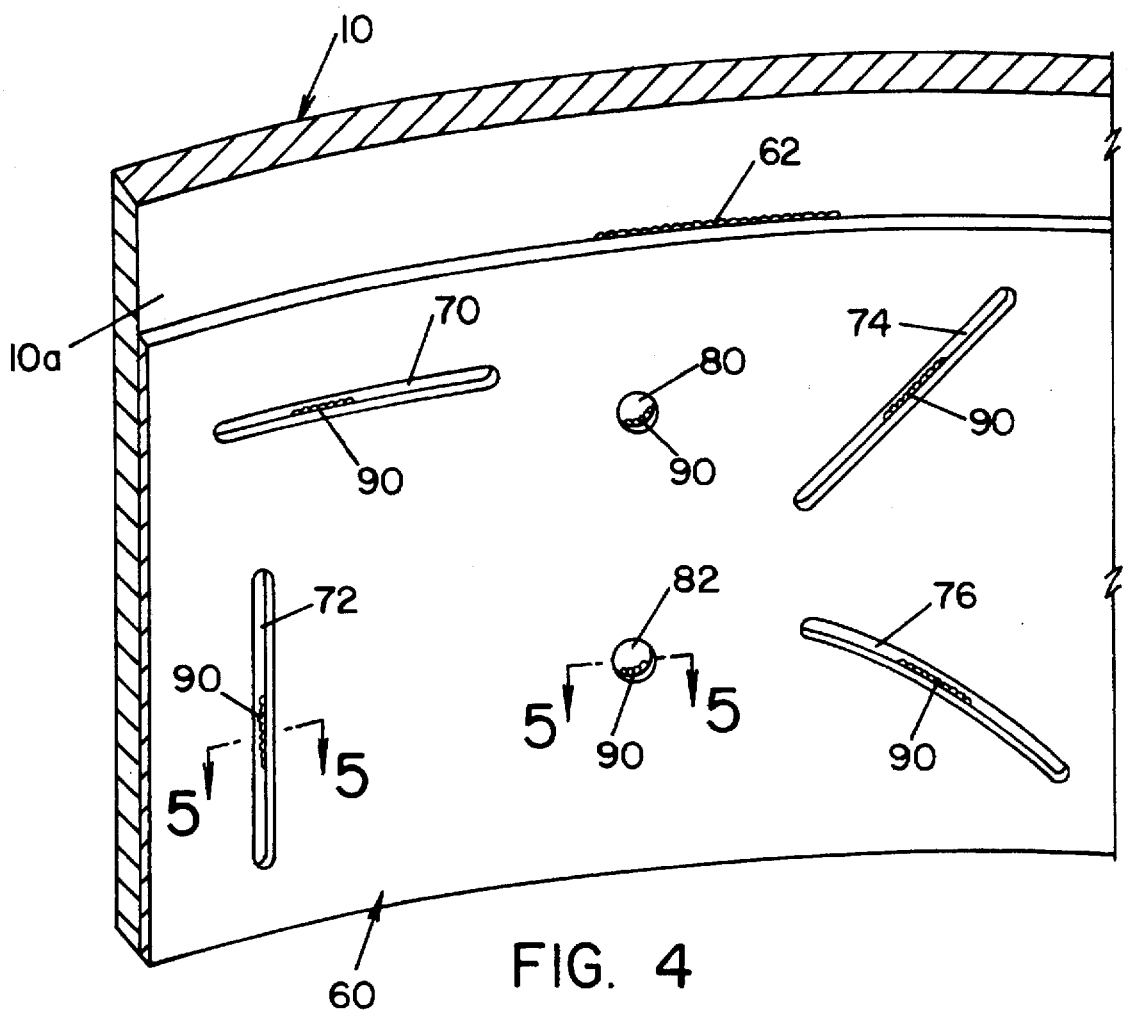
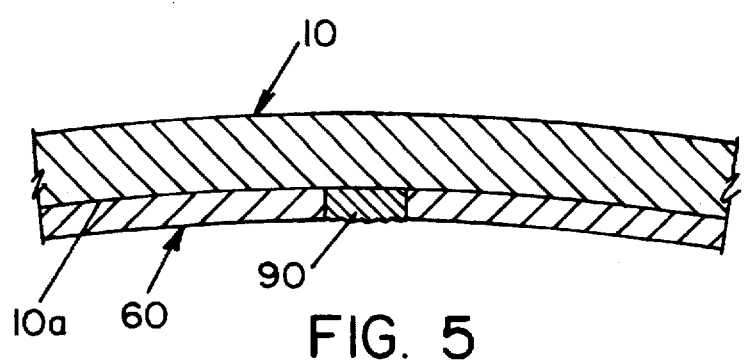

METHOD OF WELDING WALLPAPER ALLOY AN ARC WELDER MODIFIED TO PRACTICE SAME

The present invention relates to a method of welding a thin, nickel wallpaper alloy onto the inner surface of a vessel, such as a fume scrubber for a power plant and an arc welder modified to perform the novel welding method.

INCORPORATION BY REFERENCE

The invention relates to the application of a protective alloy, known as a wallpaper alloy or liner, onto the inner surface of a large vessel such as scrubbers of the type used for flue gas desulfurization in large power plants. Fume scrubbers are commonly produced with thin internal liners welded to the scrubber walls, as described generally in Gohara U.S. Pat. No. 5,494,614 which patent is incorporated by reference herein. This patent describes a type of scrubber to which the present invention would be directed and is merely background information that does not need to be repeated in this description. The invention relates to a method of welding the liner or wallpaper alloy to the inner wall of the scrubber and arc welder particularly designed to practice the inventive method. Prior to the welding of the wallpaper alloy to the inner surface of the steel vessel, the liner or wallpaper alloy, which is normally high nickel, such as 625 alloy or C-276 alloy, is mechanically attached to the inner surface of the vessel or scrubber. A variety of mechanical fasteners can be used to attach the liner or wallpaper alloy to the vessel wall, such fasteners are disclosed in Koy U.S. Pat. No. 4,993,621 and Bidefeld U.S. Pat. No. 5,054,980 which patents are also incorporated by reference. These patents disclose the use of a liner or wallpaper alloy mechanically attached to the inner surface of a scrubber in a manner to create a number of long seams. The seams existing in wallpapering are either an overlap seam or a seam between the supporting sheet steel of the vessel and the high nickel alloy of the liner. Since these patents disclose two physical attaching means that are not a part of the invention, the contents of these patents are merely background information. The wallpaper alloy is normally a high nickel alloy, such as C-276, having about 15% chromium, 5% iron, 15% molybdenum and 0.02% carbon, with the remainder nickel; consequently, it is necessary to employ a high nickel electrode of the general type disclosed in Shoemaker U.S. Pat. No. 4,639,576. This patent is also incorporated by reference.

In accordance with the invention, the arc welder used in practicing the invention is a short circuit welder of the type creating a series of welding cycles, at a rate of about 50–150. Each of the cycles includes a short circuit condition, with the welding wire transferring metal directly to the weld puddle, and an arcing condition wherein the welding wire is being melted preparatory to a short condition. The welder is the type sold by The Lincoln Electric Company of Cleveland, Ohio under the trademark STT and is generally explained in Stava U.S. Pat. No. 5,001,326 and somewhat in Stava U.S. Pat. No. 5,124,001. Both of these patents are incorporated by reference herein to teach the short circuit arc welding apparatus employed in practicing the present invention, after certain modifications. The novel method and the novel arc welder is described in this application. Details of the operation of the special short circuit arc welder are well known in the art and are shown in these patents; consequently, the general operation of the special short circuit welder need not be described in detail herein to understand the present invention. Such technology is well known in the welding art.

BACKGROUND OF INVENTION

Processing of various exhaust gases and flue gases from power plant boilers and similar large industrial processing equipment involves the passing of wet fumes or gas through large vessels formed of steel walls and known generally as scrubbers. The flue gases or exhaust gases contain corrosive substances, such as sulphuric acid, which tend to corrode the carbon steel walls of the scrubber. For that reason, at least at the lower entrant end of the scrubber, the inside wall is lined with a thin sheet of high nickel alloy, such as 625 alloy, C-4 alloy or C-276 alloy. The alloy of these sheets or liners contain a large amount of nickel and at least about 10% of chromium and 10% molybdenum, with a low content of iron and carbon. Such high nickel alloy liners are referred to as wallpaper alloy. A number of sheets with a thickness less than about 0.100 inches are attached to the inner surface of the scrubber by mechanical attachments extending between the liner sheets and the walls of the vessel or scrubber. After the liner is mechanically attached to the inner surface of the scrubber or vessel, a substantial number of long, exposed seams are created, just like in decorative wallpapering. These seams are either between the wallpaper alloy liner and the steel vessel wall or at an overlap between two adjacent liner sheets. It is necessary that these long seams be welded to support the corrosion resistant liner onto the scrubber, as well as to prevent crevices or pockets where accumulation of corrosion liquid will accelerate the corrosion process in the scrubber. The linear distance of these seams is quite large and requires a substantial amount of weld metal applied by the welding process. This process should not create weld beads which are globular or rough or a weld bead which generate a substantial amount of heat. Excessive heat will cause distortion of the thin nickel alloy during the welding process. The combination of the need for welding the exposed seams together with the need for a welding process which does not distort the relatively thin, high nickel liner sheets has caused the selection of an expensive arc welding process, or a process resulting in a weld bead that must be modified subsequent to the welding process for the purpose of smoothing out the weld bead and/or removing crevices capable of capturing corrosive liquid.

The present invention will be described with respect to the use of a high nickel wallpaper alloy, such as C-276, applied to and then welded onto the inner surface of a scrubber of the type used in a power plant to line the inner surface of the scrubber with a high corrosion resistance liner; however, the invention is much broader and can be used for applying corrosion resistant, high nickel liner sheets to the inner surface of various vessels for the purposes of providing a corrosion resistant exposed surface (i.e. such as in various types of cladding operations). In lining a scrubber with wallpaper alloy, the liner is first attached to the surface in individual, thin sheets by either mechanical means or by actually tacking the liner sheets to the vessel wall by a welding process. Thereafter, the exposed seam created by use of the corrosion resistant high nickel alloy liners must be closed by welding. This welding process involves an environment where the liner sheets will be distorted if the heat input is not limited and where the weld bead profile is extremely important to avoid subsequent processing to smooth the bead. The welding process involves the feeding of an electrode or welding wire toward the seam to be welded while an electric arc is used to melt the welding wire and apply the welding wire in a weld metal pool traveling along the seam being welded. In the past, wallpapering has involved the use of an arc welder operated in the pulse mode. A series of the peak current pulses are followed by background current pulses. During the peak current pulse, the weld wire is melted by the arc extending between the welding wire or electrode and the workpiece. Thereafter, the melted electrode or welding wire is transferred through the arc to the seam. The arc is continuous and is maintained by the background current. This process was used in the past because it does not create a substantial amount of spatter, but a high peak current is required for puddle fluidity. Excessive peak currents, however, will limit the low average current capability making out of position welding difficult. High heat is generated in the workpiece or wallpaper alloy during the welding process requiring rapid travel and, also, making out of position welding more difficult. The arc melts the metal on the end of the welding wire and transmits the melted metal to the weld bead through the low current arc. In the pulse welding mode, the background current will be maintained quite low. This is important when welding thin nickel alloy which can be distorted easily with high welding temperatures. Further, the welding wire has a high resistivity and must be relatively small in diameter. When applying metal to the seam created by the applied wallpaper alloy liners, the overall heat must be balanced by a sufficient heat at the weld bead to flow the melted electrode and cause a good welding bond while not increasing the temperature of the liner to cause distortions of the liner sheets at the seam. If this balance is not accomplished, there is a need to smooth out the weld bead after the arc welding process. This smoothing involves a subsequent process step adding cost to the operation. In the past, the pulse arc welding process has been used with a low background current to maintain the heat of the weld bead metal so that the bead would be uniform. By moving the welding process at a controlled rate, sufficient heat was maintained in the weld pool without overheating the alloy to cause distortion. This process is slow and the process required a welding wire with a diameter in the neighborhood of 0.035 inches of high nickel material. Such welding wire was difficult to draw and quite expensive, compared to somewhat standard 0.045 welding wire. The larger welding wire could not be used because it could not be melted effectively in an arc welding process operated in the pulse mode. In the welding of aluminum and stainless steel, it is common practice to use a TIG welding process. However, such process, when attempted for welding seams of the wallpaper alloy liner in a scrubber, was extremely expensive and required the introduction of the welding wire from a separate supply. This process was not convenient in wallpapering.

In recent years, The Lincoln Electric Company of Cleveland, Ohio has introduced an arc welder under the trademark STT, which welder uses a short circuit welding process wherein the actual contour of the current pulses is controlled by a rapid switching circuit to produce a succession of welding cycles that include an arcing condition and a short condition. During the short condition, the molten metal ball on the end of the welding wire is transferred to the weld pool in a controlled manner until the necking of the molten metal is imminent. Thereafter, the welding current is dropped and the welding cycle shifts its arcing condition. During the arcing condition, the welder controls a plasma boost current pulse having a high current which is maintained for a fixed time. Thereafter, the arcing condition continues but at a low background current level. The background current level is normally in the range of 50–75 amperes. The peak current level of the plasma boost pulse is in the general neighborhood of about 300 amperes. If the current shifts instantaneously from the peak current to the low background current, puddle dynamics could cause spatter. In the well known, patented, special arc welder, the current decreases from the peak level in the plasma boost pulse to the background level along a controlled curve, which is a time constant curve controlled by the rapid switching operation of the welder. Switching of the current occurs at a rate of approximately 20 KHz, so the current during the transition between the high peak level of the plasma boost pulse and the low background level is gradual to avoid an immediate current shift. The portion of the arcing condition between the plasma boost pulse and the background current is referred to as the plasma portion of the arcing condition. This portion involved rapid decrease with a time constant profile to prevent pool distortion. Efforts to use this quite successful commercial welder for welding the seams in wallpapering or in liner applications has not been successful. To obtain the necessary heat for maintaining the fluidic and wetting characteristics of the pulses along the seam, the background current had to be raised to a level which caused distortion of the thin nickel alloy being welded. Consequently, the use of the commercial short circuit welder, as generally illustrated in Stava U.S. Pat. No. 5,001,326 and Stava U.S. Pat. No. 5,148,001, was not successful for welding wallpaper alloy to the inner surface of a fume or exhaust gas scrubber.

THE INVENTION

Although the short circuit arc welder of the general type shown in Stava U.S. Pat. No. 5,001,326 and Stava U.S. Pat. No. 5,148,001 has been extremely successful in a wide variety of welding applications, the manner of adjusting the overall heat applied to the workpiece was by adjusting the background current level. Energy or heat used for melting the metal on the end of the welding wire preparatory to short circuit transfer of the metal was controlled essentially by the peak current of the plasma boost pulse. In accordance with the welder in Stava U.S. Pat. No. 5,001,326, the energy used in melting the metal preparatory to short circuit transfer was also controlled by a watts meter that terminated the plasma portion of the arcing condition when a certain amount of energy had been expended in forming the molten metal ball on the end of the welding wire; however, the transition to the background current was at a low current level. The decrease in current during the plasma portion of the cycle, where the current decreases from the peak current to the background current, was controlled by a time constant circuit. This circuit was fixed, after it was trimmed at the factory. It was not adjusted to control heat applied to the molten metal ball. In practice, the current was reduced from the maximum or peak level to the background current level in substantially less than 2.0 ms. The decay time was substantially less than 25% of the time between the plasma boost pulse and the short condition of the welding cycle. The welding cycles were created at a rate of 50–150 cycles per minute according to the parameters of the welding process. The short circuit welder disclosed in Stava 5,001,326 was not used for welding wallpaper alloy to the inside surface of a scrubber or vessel.

In accordance with the present invention, there is provided a method of welding a wallpaper alloy to the inside surface of the vessel or scrubber wall so that a corrosion resistant liner is provided on the wall formed from corrosion susceptible steel. After the wallpaper alloy has been affixed to the inside surface of the vessel wall there are a plurality of exposed seams extending along given paths. In accordance with the present invention, a welder of the short circuit type disclosed in Stava U.S. Pat. No. 5,015,326 is used so that a welding wire is moved toward the seam and travels along the path of the individual seams. The short circuit arc welding process is employed to melt and deposit the welding wire metal onto the seam created by the sheets of wallpaper alloy. The particular short circuit welding cycle used in the novel method includes a short condition and an arcing condition wherein the arcing condition constitutes a plasma boost portion with a set peak current level followed by a plasma portion with a current decreasing from the peak current level toward a set, low level background current. In the short circuit process of the novel method, there is a given time between the plasma boost portion and the short condition of the welding cycle. In accordance with the invention, the length of time of the plasma portion of the arc condition, which portion is the time when the current is decreasing from the maximum or peak current to the background current, is set to a value greater than 25% of the given time between the plasma boost portion and the short condition. In this manner, a substantial amount of heat is added to the welding process during the melting of the metal ball so that the heat need not be increased by raising the level of the background current. This is a novel method for using the previously patented short circuit welder. This prior welder is modified in a manner to allow welding of the wallpaper alloy to the inside surface of a scrubber by the novel method of the present invention. In accordance with another aspect of the present invention, the plasma portion during the arcing condition of the welding cycle is greater than 2.0 ms. In the past, the time constant RC of the decreasing current portion of the arcing condition was set at a fixed level, which level caused the current to drop to the background level in substantially less than 2.0 ms and in a time substantially less than 25% of the time between the plasma boost pulse and the introduction of the short condition caused by the melted metal ball on the end of an electrode engaging the molten pool to start short circuit transfer of metal to the pool. By this novel method of welding the wallpaper alloy to the scrubber walls, it has been found that the patented short circuit arc welder can be employed effectively. This has not been accomplished in the past.

In accordance with another aspect of the present invention there is provided a short circuit arc welding apparatus comprising a D.C. power supply means for causing a welding current of different levels to pass through a welding wire and a workpiece at a molten metal pool on the workpiece. A wire feeding means is used to feed the wire from the holder toward the workpiece whereby the welding wire is subjected to a succession of welding cycles. Each cycle includes an arcing condition, during which the wire is spaced from the pool and the energy applied to the wire exceeds a given value raising the temperature at the end of the wire to a molten temperature to form a molten metal ball on the end of the wire, and a short circuit condition, during which the molten metal ball on the end of the wire first contacts the molten metal pool and then transfers from the wire to the workpiece by a necking action breaking the molten metal ball from the wire to initiate the arcing condition of the next welding cycle. This type of short circuit arc welder is unique and includes a plasma boost portion and a plasma portion following the plasma boost portion. The plasma portion has a decreasing current level to cause a less than immediate shift to a set background current level. This previously patented short circuit welder is modified to control the curve of the decreasing current during the plasma portion by use of a knob on the face of the welder for manually adjusting the resistance value of the RC time constant curve followed by the current in the plasma portion of the welding cycle. By using this improvement, a short circuit arc welder can be used in performing the method of the present invention for welding wallpaper alloy to the inner surface of a scrubber. Heretofore, a short circuit arc welder could not be used for welding wallpaper alloy onto the inner wall of a scrubber, since the heat necessary for melting the ball was increased by increasing the background current. This adjustment had the tendency of introducing increased energy into the weld pool causing distortion of the thin nickel liner constituting the wallpaper alloy or liner sheet. By using the present invention, the energy is adjusted by adjusting the "tailout" or "down slope" previously referred to as the plasma portion of the arcing condition in the arc welder disclosed in Stava U.S. Pat. No. 5,001,326. By increasing the amount of energy during the tailout, down slope or plasma portion of the arcing condition, the deposition rate of the welding process can be increased while a lesser amount of heat is applied along the seam being welded. Consequently, a substantially increased tailout to the background current level is used in the present invention so that the increased energy in the welding cycle is concentrated in the time after the plasma boost has formed a ball on the end of the advancing welding wire. The invention involves adding an increased tailout to more slowly decrease the current of the plasma boost of the welding cycle used in the patented short circuit welder.

When using a short circuit welder for high nickel welding, including a short circuit welder with the characteristics of the welder in Stava U.S. Pat. No. 5,001,326, welding of the workpiece is difficult. The same problems are experienced in a stainless steel welding application. To increase the temperature for the purpose of improving the wetting characteristics of the weld bead, the heat input causes distortion which is especially disadvantageous with a relatively thin nickel alloy used for lining scrubbers or stainless steel. In addition to the distortion caused by increasing the heat applied in the welding operation, the bead is not smooth if the heat is reduced. The bead, thus, requires a subsequent smoothing. By using the present invention, the increased heat is created in a limited portion of the welding cycle, so that the patented short circuit welder can now be used for wallpapering with a smooth bead. This patented welder with a modification in its weld profile produces a better weld and is dependable in operation. This type welder requires a less skilled operator than pulse welding or TIG welding. In addition, short circuit welding in general is more forgiving to the operator than pulse welding or precision TIG welding.

In accordance with the present invention, the current profile of each cycle is created by a series of narrow current pulses produced at a rate of substantially 20 KHz. The profile shifts slowly from the peak current to the background current to increase the wattage in the arc. This increases the average current and has a tendency to increase the arc length. In the past, the only way to increase the wetting characteristics caused by the welding process of the welder in Stava U.S. Pat. No. 5,001,326 was to raise the background current. Thus, the molten metal ball would continue to grow as it is brought down toward the pool before initiating the short. Since the nickel electrode or wire required to weld the high nickel wallpaper alloy has a high resistivity, the increased tailout after the plasma boost pulse introduces substantial heat in the electrode for the purposes of melting the electrode. In this manner, the electrode can be increased from 0.035 inches to 0.045 inches. Such increase in the size of the electrode which can be used in the welding process substantially decreases the cost of the metal being deposited. High nickel wire used for welding high nickel alloy is more difficult to draw in a small diameter than in a large diameter. The use of a large diameter is made possible by the present invention.

It has been found that the tailout, down slope or plasma portion of the welding cycle should be increased so that the time necessary for the current to decrease from the peak current to the background current is increased to at least 25% of the total time from the plasma boost pulse to the short circuit condition of the cycle. By increasing the time of the tailout, down slope or the plasma portion of the welding cycle, the electrode can be melted effectively without increasing the level of energy introduced into the weld pool. This process has been proven to be at least four times more rapid than the use of TIG welding for wallpapering.

The present invention employs heat introduced in the arc, as opposed to heat introduced into the weld pool which would occur with merely an increase in the background current. By using the present invention, the weld pool is adequately wetted and is smooth, without requiring subsequent processing and few, if any, crevices are created in, or by, the weld bead.

In the patented short circuit arc welders of the type shown in Stava U.S. Pat. No. 5,001,326, the background current was raised to provide additional heat to the welding process. In accordance with the present invention, the heat input to the welding process is accomplished without increasing the background current. This method of heat control minimizes overheating of the alloy sheet and while increasing melting of the electrode. This heat control feature of the present invention has a significant effect when the electrode has high resistivity, such as high nickel or stainless steel alloys. Since high nickel alloy is used for corrosion protection on the interior walls of smoke stacks and scrubbers, the very successful short circuit arc welder of Stava U.S. Pat. No. 5,001,326 was not applicable for wallpapering. The wallpapering process had to be spatter free and had to produce smooth weld beads so that the corrosion liquids could not attack and cause corrosion of the welded seams. Spatter control was possible in the patented short circuit arc welders; however, the necessary heat could not be accomplished without overheating the thin wallpaper alloy liner. Consequently, the present invention involves a wallpapering method that replaces pulse welding with a short circuit process. The pulse welding involved relatively slow travel of the welding wire at a rate where the heat energy in joules per inch was relatively high. Such high energy levels had a tendency to cause distortion of the nickel alloy liner pieces, which was not desirable.

By using the present invention, wallpapering is accomplished with virtually no weld spatter, at a higher deposition rate, at a lower input heat per linear unit of the bead and the welding can be accomplished in all positions. The bead is well formed and need not have additional processing for appearance, or to reduce crevices. The additional heat required for good bead wetting and faster travel is obtained, in accordance with the present invention, by a method that increases the tailout, or the time for decreasing the current between the peak current and the background current. It is not necessary to increase the background current to increase the heat input of the short circuit welding process. Under these circumstances, the molten ball is not overheated because the background level is set and maintained at a low level. However, the total heat input is increased by the increase of the tailout or down slope. This gives good wetting, low spatter and fast travel speeds.

When the background current is increased in the patented short circuit arc welder, the molten droplet continues to grow during the plasma or arcing condition to form a larger ball. As the ball diameter exceeds 1.2 times the electrode diameter, excess spatter will be generated. The present invention involves the increase of the switching time between the peak current background current in a standard short circuit welding process, as shown in Stava U.S. Pat. No. 5,001,326. The invention involves controlling the heat of the welder by controlling the switching time from the peak current to the background current. This method of heat control minimizes the formation of large droplets on the electrode tip in those applications where more joule heating is required without higher heat in the workpiece, such as when nickel or stainless steel is being welded.

The primary object of the present invention is the provision of a method of welding a corrosion resistant wallpaper alloy to the inside surface of a vessel formed from a corrosion susceptible steel sheet, which method utilizes a short circuit arc welding process of the type having an arcing condition with a plasma boost pulse followed by background current. This novel method produces a superior weld bead, has a high deposition rate and reduces the distortion of the wallpaper alloy during the welding process.

Yet another object of the present invention is the provision of an arc welder of the type employing a short circuit welding process, which arc welder has an adjustable tailout feature for the plasma portion of the welding cycle, wherein the current is decreased from the peak current to the background current at a slow rate.

Still a further object of the present invention is the provision of a method for wallpapering and a welder modified to practice the same, which method and welder are easy to employ, and produce a welding result superior to either a TIG welder or a welder operated in the pulse mode.

These and other objects and advantages will become apparent from the following description.

BRIEF DESCRIPTION OF DRAWINGS

FIG. 4 is a pictorial view showing wallpaper alloy attached to the inner surface of a scrubber wall, with a series of cut out portions employed for welding or tacking the thin nickel wallpaper alloy sheet onto the inner surface of the scrubber wall;

FIG. 5 is an enlarged cross sectional view taken generally along the lines 5—5 of FIG. 4;

FIG. 11 is a wiring diagram and pictorial view showing the potentiometer used in the invention for controlling the

Figure 6:
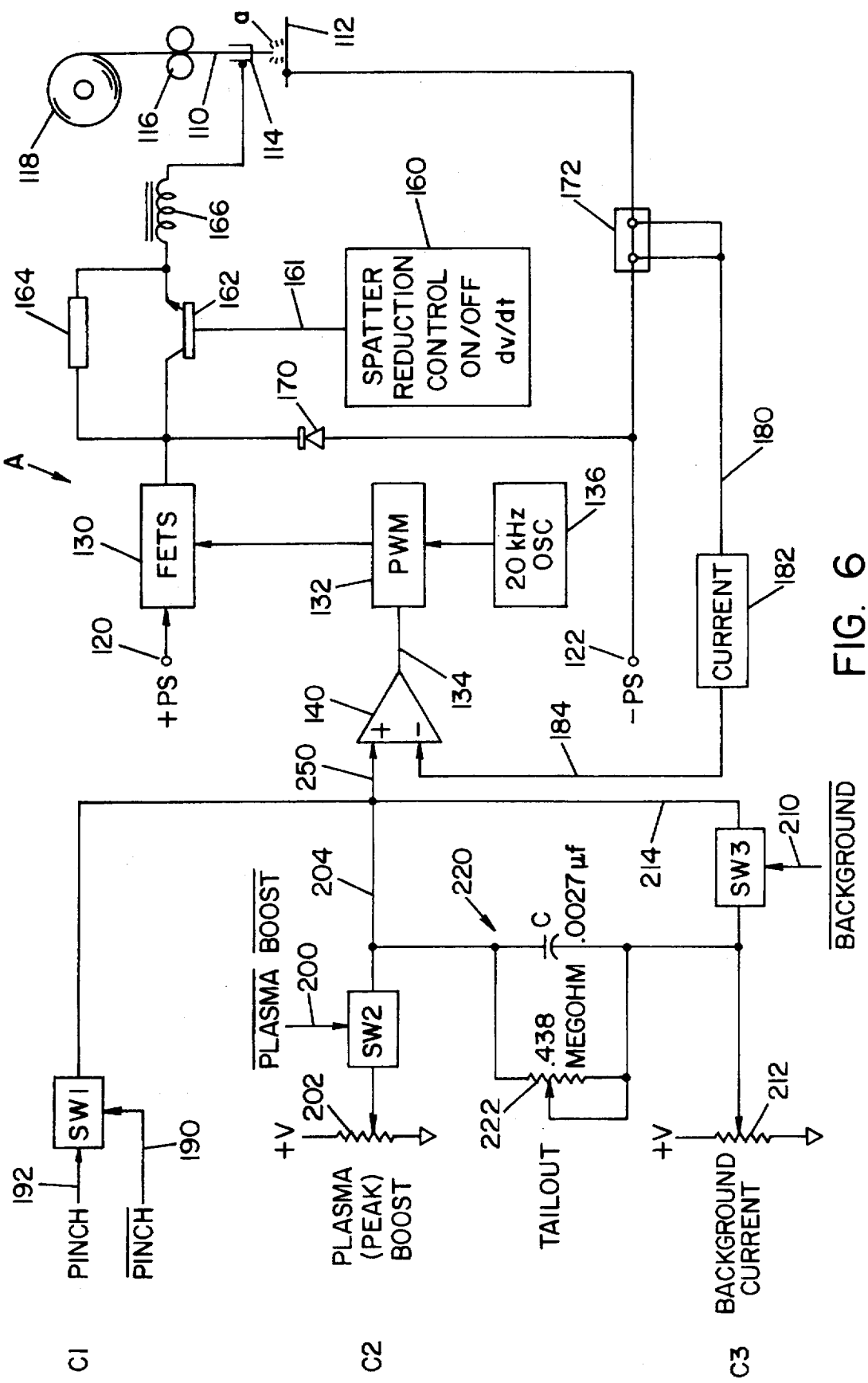
FIG. 6 is a wiring diagram similar to the disclosure in Stava U.S. Pat. No. 5,001,326 showing a short circuit arc welder of the type used in practicing the preferred embodiment of the present invention.
Figure 10:
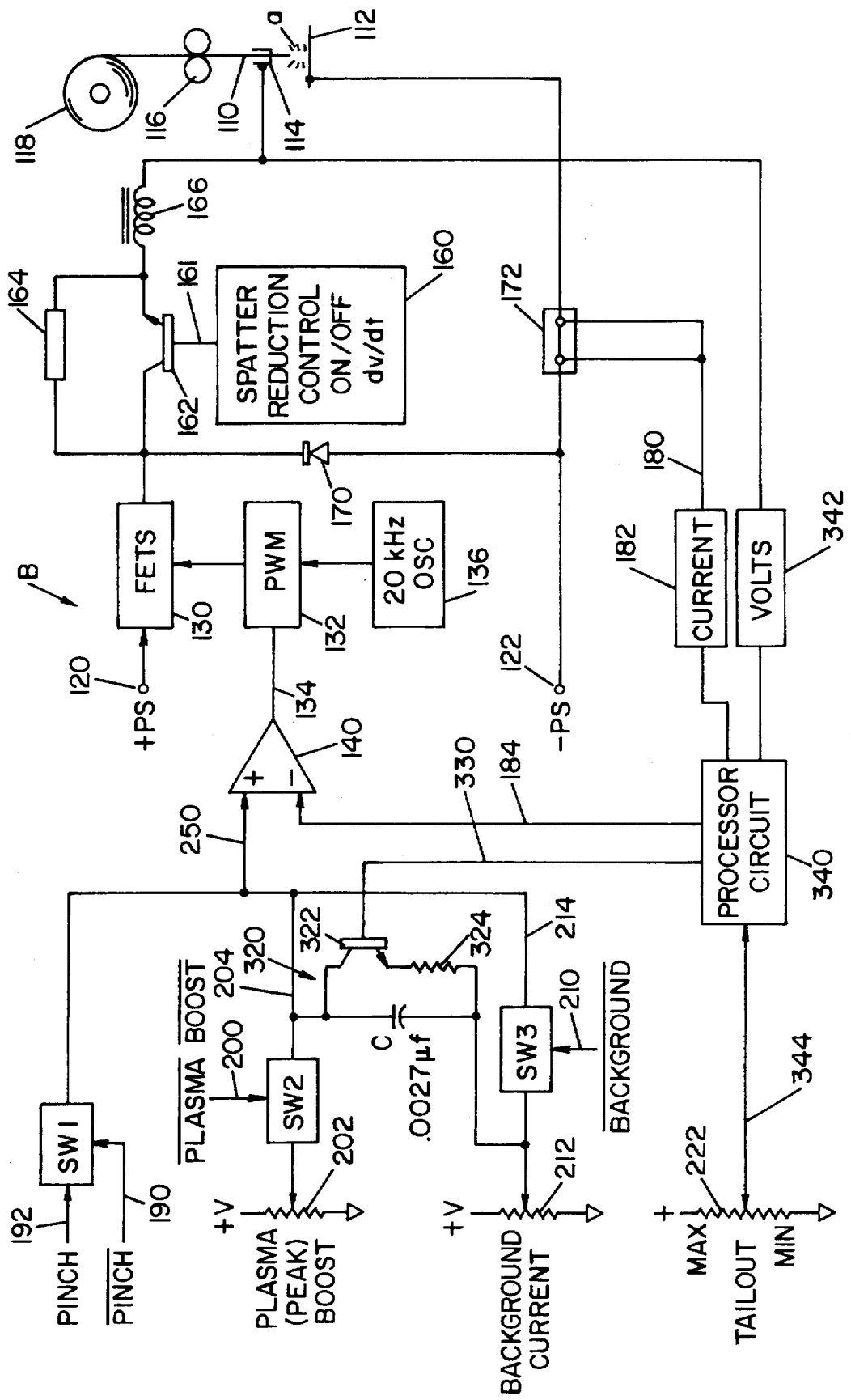
FIG. 10 is a wiring diagram, similar to the wiring diagram shown in FIG. 6, with a slight modification.
Figure 12:
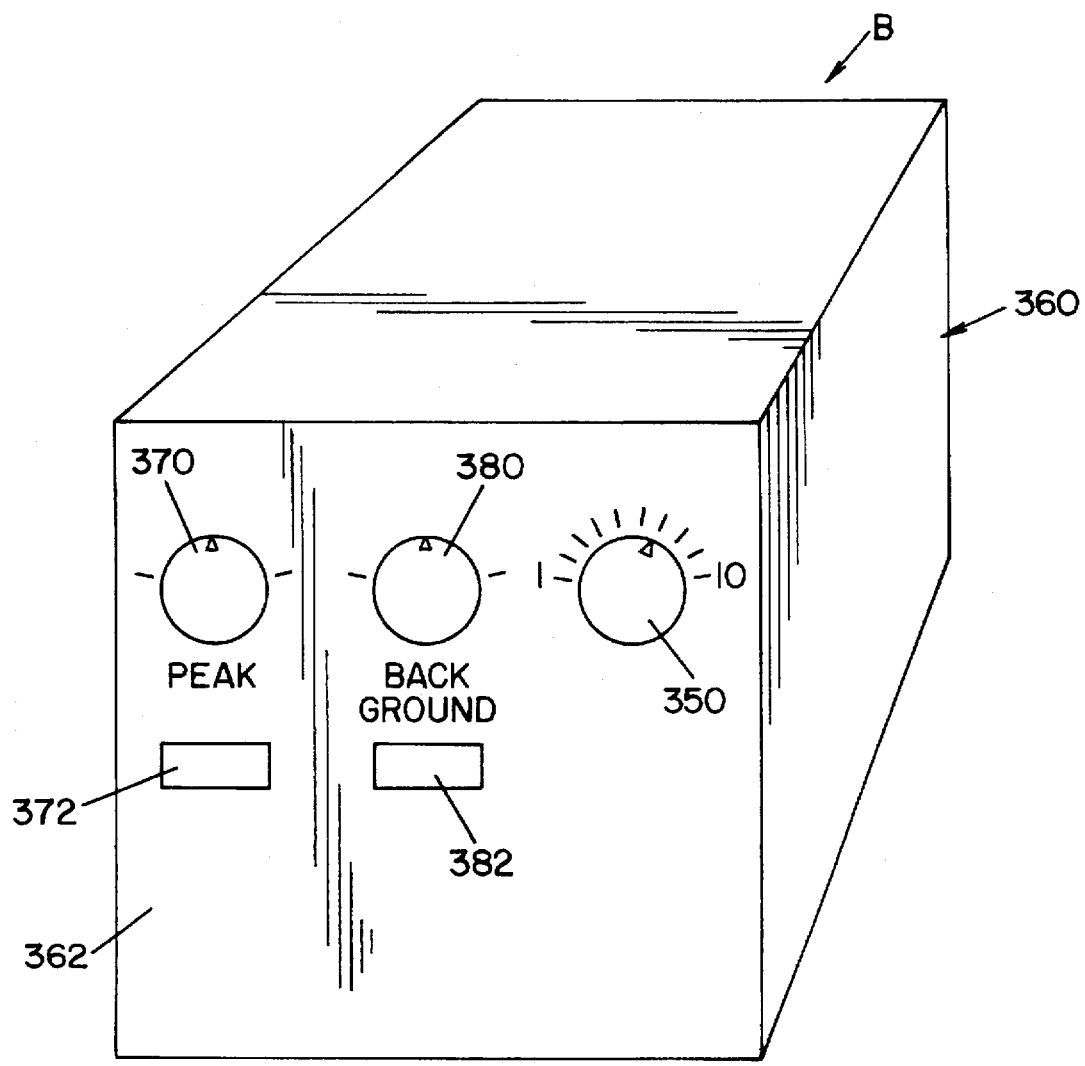

9 tailout in the wiring diagram shown in FIG. 6 and in the wiring diagram shown in FIG. 10; and, FIG. 12 is a pictorial view of an arc welder showing the face plate used in practicing an aspect of the present invention.

PREFERRED EMBODIMENT

Figure 1:
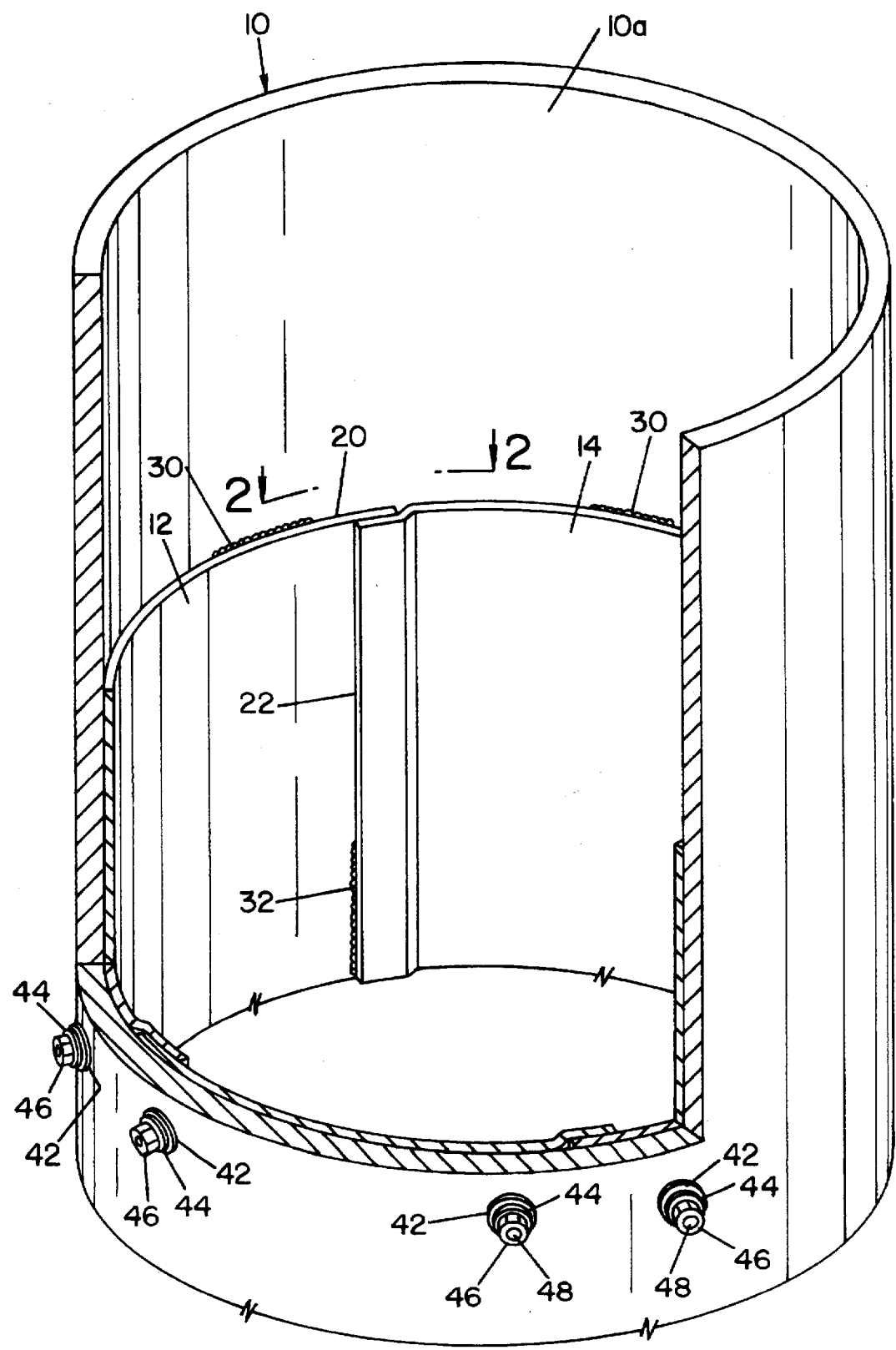
FIG. 1 is a pictorial view showing a portion of the inner surface of a scrubber, with wallpaper alloy sheets applied.
Figure 2:
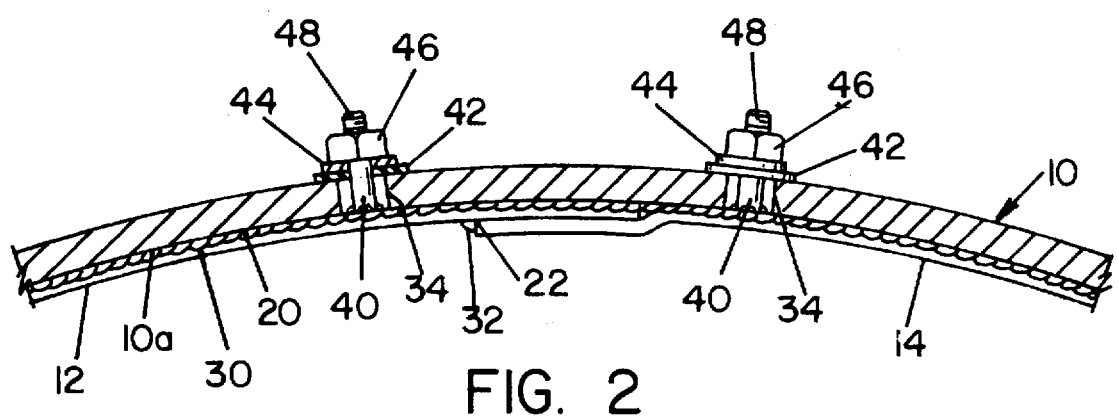
FIG. 2 is an enlarged view taken generally along line 2—2 of FIG. 1.
Figure 3:
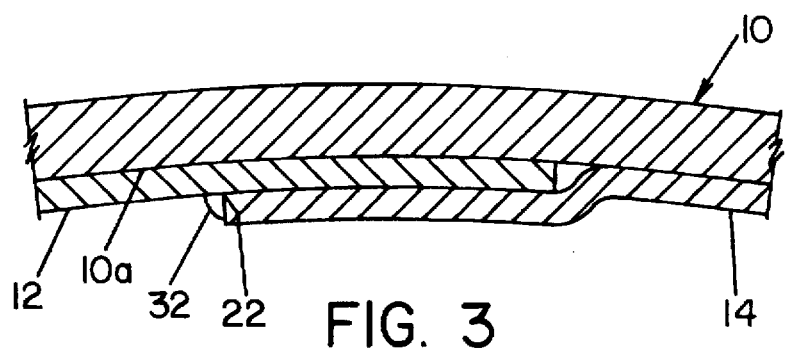
FIG. 3 is a partial view showing a further enlargement of the cross sectional view shown in FIG. 2.

Referring now to the drawings wherein the showings are for the purpose of illustrating the preferred embodiment of the invention and not for the purpose of limiting same, FIGS. 1-3 show a scrubber wall 10 with an inner surface 10a and wallpaper alloy sheets 12, 14 fixed thereto to define a top seam 20 and an overlapping seam 22. The wallpaper alloy is preferably C-276 having 14.5-16.5% chromium, 4-7% iron, 15-17% molybdenum and 0.02% carbon with the remainder being nickel. This alloy has a thickness of less than 0.100 inches and is conformed to the curvature of the carbon steel of scrubber 10. The scrubber is a cylindrical container formed from relatively heavy carbon steel plates which are fairly corrosive when used with flue gas or fumes from corrosive processes. As shown in FIG. 2, mechanical fasteners, only two of which are shown, are used to draw the relatively thin nickel sheets 12, 14 against the surface 10a of scrubber 10. These mechanical fasteners, include a stub 40 welded to the undersurface of one of the sheets 12, 14 and extending through an opening 34 to intersect gasket 42 and washer 44. A nut 46 is threaded on shank 48 to draw the wallpaper alloy sheets into tight engagement with the surface 10a of scrubber 10. After mechanically connecting the wallpaper alloy, a bead of weld metal is deposited along the exposed seams, two of which are shown as seams 20 and 22. Seam 22 comprises an intersection between the inner section of a high nickel alloy sheet and the steel sheet forming scrubber 10. Seam 22 is an overlap seam between adjacent wallpaper alloy sheets 12, 14. After mechanically fastening the liner in place, the beads 30, 32 cover the exposed seams and form a barrier to the accumulation of corrosive material. These weld beads 30, 32 also structurally join the wallpaper alloy to the inner wall of scrubber 10. Heretofore, beads 30, 32 have been formed by an arc welding method using a high nickel welding wire having a diameter of about 0.035 inches and employing a pulse mode of operation. This welding mode was the process of choice, because the pulse mode created low heat during the welding operation to prevent distortion of the high nickel plates which is a problem whenever welding high nickel sheets, especially thin sheets. This same problem exists when welding thin stainless steel sheets onto a support structure, such as low carbon steel as used in scrubber 10. By using the pulse mode of operation for an electric arc welding process, distortion is controlled by moving the electrode slowly along the path defined by the seams 20, 22. Rapid movement necessary for high deposition rates is prevented due to the level of heat that must be employed in the welding process for the purpose of wetting the weld metal pool which forms beads 30, 32. Efforts have been made to use TIG welding in wallpapering since TIG welding is common for certain stainless steel tubing and sheeting. However, such TIG welding processes may produce a relatively good bead, but it is quite slow and requires a highly skilled welder. All of these reasons have resulted in the pulse mode of operation being used for welding with high nickel electrodes to form the weld bead in the wallpapering process. Beads 30, 32, in accordance with the present invention, are provided by a method using an arc welder operated in the patented short circuit mode, as described in Stava U.S. Pat. No. 5,001,326 and Stava U.S. Pat. No. 5,148,001. The welding process obtained by these welders has been modified in accordance with the invention, as will be explained in connection with FIGS. 8 and 9.

Even though mechanical connectors are contemplated for attaching the wallpaper alloy sheets to scrubber surface 10a, it is also appropriate to provide various slots and/or holes in the thin high nickel alloy sheets, as illustrated in FIG. 4. A horizontal slot 70, vertical slot 72, angled slot 74 and/or curved slot 76 can be cut in liner 60 so that liner 60 can be tacked by welding onto the inner wall of scrubber 10. In addition to slots 70-76, holes 80, 82 could be employed for the same purpose. As shown in FIG. 5, a weld bead 90 is used to fill either the slots or the holes for the purpose of tacking liner 60 onto the cylindrical inner surface 10a of scrubber 10. After the liner has been tacked in place, a weld bead 62 is provided using the present invention.

Figure 7:
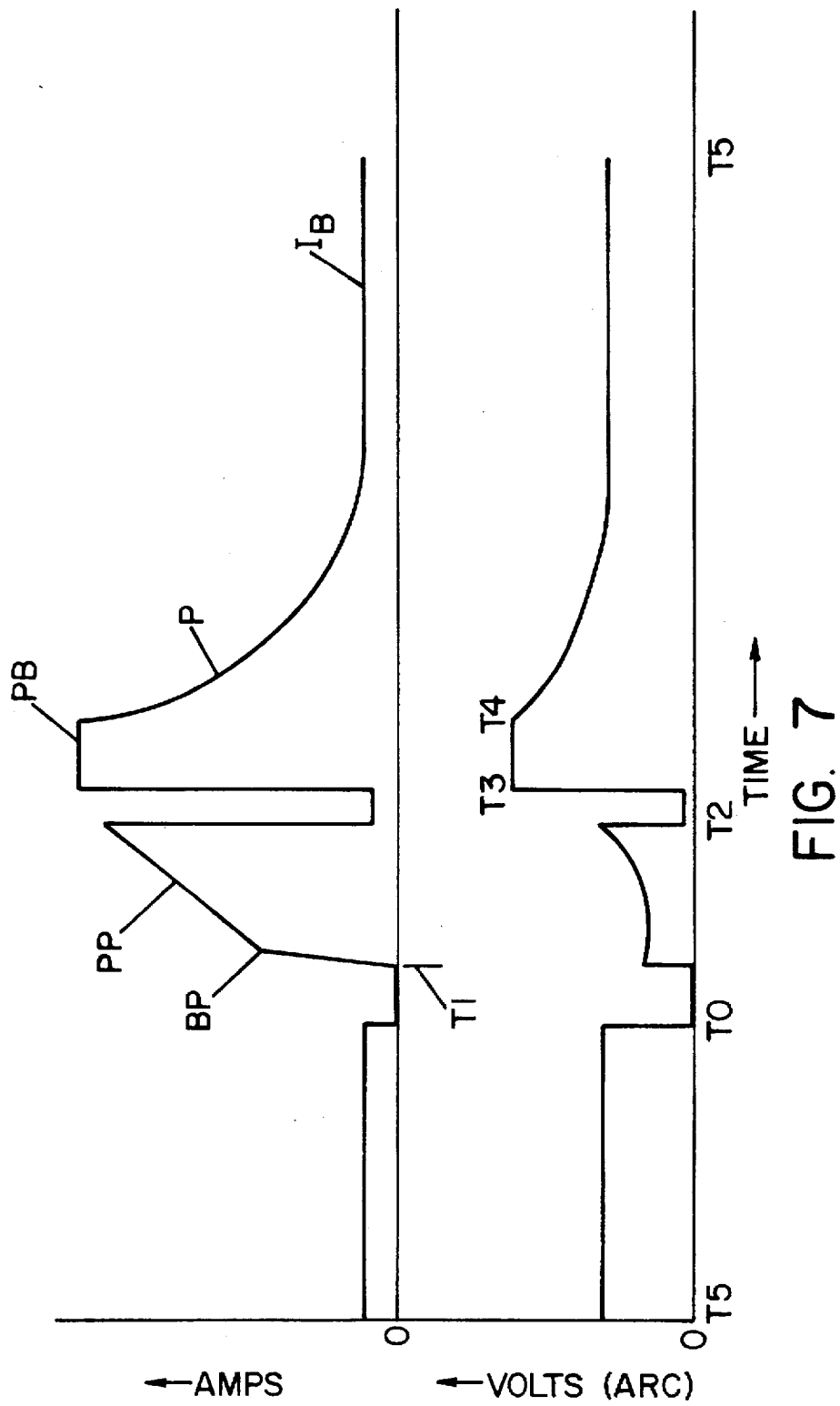
FIG. 7 shows voltage and current graphs of a single welding cycle employing the preferred embodiment of the present invention by the operation of the welder shown in FIG. 6.
Figure 11:
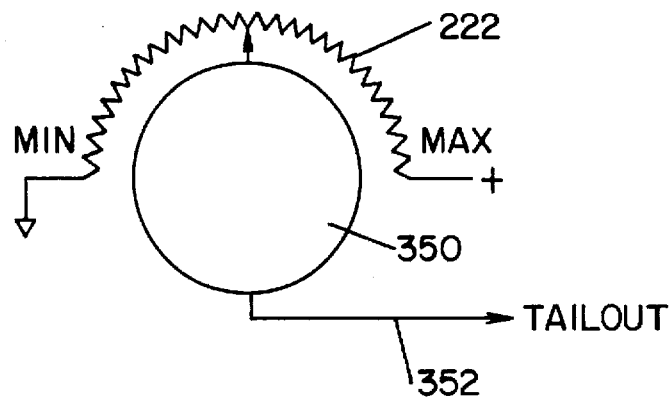

The standard, albeit patented, short circuit arc welder of the type used in practicing the present invention is illustrated in FIG. 6. The resulting voltage and current graphs for this welder are shown in FIG. 7. This welder is of the type disclosed in Stava U.S. Pat. No. 5,001,326 and is illustrated in simplified form to show merely the aspects of this commercial patented welder as it has been modified to the practice of the present invention. Welder A includes a power supply with a current input scheme using various distinct voltage responsive current controls for creating separate current portions of a cycle for short circuit welding, as shown in FIG. 7. These control circuits follow the voltages applied to the command signal lines, three of which are shown as lines C1-C3. Welding wire 110 is spaced from workpiece 112 while being supported in an electrical connector or holder 114. Wire 110 can be driven through holder 114 by an appropriate wire feeder 116 form a supply spool 118 at a rate determined by the operator. Holder 114 is connected to one terminal of a D.C. power supply PS. The amount of wire extending from the holder and above arc a defines the extension or stick out for welding wire 110. Power supply PS includes a positive output terminal 120 and a negative output terminal 122 in accordance with standard practice. Power switch 130 is cycled at approximately 20 KHz by a pulse width modulator 132 of standard design having a control line 134 and a driving oscillator 136. Consequently, the voltage on control line 134 indicates the width of the 20 KHz current pulses allowed to pass through switch 130. In this manner the welding current through welding wire 110 and across arc a, when an arc exists, i.e. during the arc condition of the welding cycle, is controlled by various voltage responsive control circuits, three of which are shown as control circuits C1-C3. The pulse width controlling voltage on line 134 is the D.C. voltage level at the output of an error amplifier 140. The prior art spatter control circuit 160 is operated in response to an impending fuse sensed by a dv/dt premonition circuit, so that the output on line 161 controls power switch 162. The indication of an impending fuse by breaking the short circuit caused by deposition of the molten metal from wire 110 to the workpiece weld will render power switch 162 non-conductive immediately before a fuse is created during the pinch pulse PP of FIG. 7. Operation of power switch 162 changes the flow of welding current through choke 166 from a general high level through switch 162 to a generally low level through a snubber circuit 164. As the short circuit portion of a welding cycle progresses, the measured dv/dt exceeds a set value indicative of an impending fuse and the logic on line 161 shifts. Welding currents from power switch 162 is shifted to a low level to reduce the energy released by the fuse to reduce spatter. This concept does not form a part of the improvement constituting the present invention, which improvement involves merely the control of the plasma portion P, as schematically illustrated in FIG. 7. The plasma portion P is the tailout or down slope between the high peak current level at the top of the plasma boost pulse PB and the low background current. A free wheeling diode 170 is included. The sensed current in line 180 from shunt 172 is passed through a current switch 182 to the negative terminal of error amplifier 140 by way of input 184. The voltage on line 134 controls the amount of current at each given moment in the current pulse, as shown in FIG. 7. This switching concept to create tailored pulses is illustrated in more detail in Stava U.S. Pat. No. 4,148,001. Referring again to FIG. 7, the voltage and current graphs involve a background current portion $I_B$. At time T0 a short circuit is sensed. The voltage is immediately shifted to zero because there is a short across arc a. A zero current or a background current is then maintained until time T1, which time between T0 and T1 is a very short fixed interval of less than about 1.0 ms. In practice, the time between T0 and T1 is about 0.50 ms. At time T1 a controlled pinch pulse PP is created. This pinch pulse has a break point BP. Before the break point, the slope of the current created by the voltage on line 134 is relatively steep. Thereafter, the voltage on line 134 causes a gradual increase of the current in pinch pulse PP until the premonition circuit indicates an impending break, neck or fuse of the short circuit metal. Thereafter, at time T2 the current is rapidly decreased by opening switch 162. The switch is then closed to create a plasma boost pulse PB having an upper current level which is the peak current. At a fixed time, indicated as time T4, the voltage on line 134 is then controlled by the tailout circuit during the plasma portion P. Portion P is a controlled decrease from the peak current at time T4 to the background current prior to a short at T0. During the plasma boost pulse, the metal on the end of electrode or wire 110 is heated and forms a large ball. This ball is maintained heated by the background current until the ball engages the molten metal pool which causes a short at time T0. To control the various aspects of the current pulse by controlling the voltage on line 134, three separate circuits are used, as illustrated in FIG. 6. Of course, arc current is also controlled by opening power switch 162 immediately before a neck or fuse is formed in the molten metal being deposited in the pool during the short condition of the welding cycle. Referring to the voltage command signals, C1–C3, switch SW1 is closed at time T0 when a short is sensed by a rapid decrease in the voltage across arc a. Line 190 shifts to a logic 0 causing the voltage on pinch control line 192 to control the profile of the pinch pulse PP. At time T2 the logic on line 161 shifts to open power switch 162 causing an immediate decrease in the current preparatory to the creation of a plasma boost pulse PB by the closing of switch SW2 when a logic 0 appears in line 200. This occurs at a somewhat variable time, less than 0.50 ms, after switch 162 is opened and then closed at time T3. This immediately applies maximum current across the arc, which current has a value determined by the voltage on line 134 and is controlled by switch SW2 having an input from potentiometer 202 and output 204. The adjusted peak current is controlled by a knob adjusting the potentiometer 202, as shown in FIG. 11. After a fixed time, switch SW2 is opened so that the voltage on line 204 decreases toward the background current which is initiated by closing switch SW3 when a logic 0 appears on line 210. This voltage decreases toward the voltage indicative of background current on line 214. The voltage on line 204 shifts from peak voltage controlled by potentiometer 202 to the background voltage controlled by potentiometer 212. To accomplish this gradual shift along the time constant curve shown in FIG. 7, tailout control 220 is provided in welder A. A potentiometer 222 is adjustable between 0.05–0.500 Megohms. Capacitor C has a capacitance of 0.0027 µf. The command line 250 is directed to the positive input of error amplifier 40. During the plasma boost portion PB, the voltage of command signal C2 controls line 134. Thereafter, switch SW2 is opened and switch SW3 is closed. The voltage on line 204 is then controlled by the tailout control circuit 220 so that the voltage on line 204 follows the voltage on capacitor C. This voltage is discharged from the peak voltage through potentiometer 222 in a time constant curve having a TC value determined by the position of potentiometer 222. Ultimately, capacitor C is discharged to the voltage on potentiometer 212, which voltage corresponds to the voltage on line 214. This is schematically illustrated in the voltage and current graphs of FIG. 7. The voltage on line 134 controls the current across the arc a. To practice the present invention, potentiometer 222 is adjusted to substantially increase the resistance to drastically increase the time necessary for the capacitor C to be discharged and, thus, for the arc current to move from the peak current set by potentiometer 202 to the background current set by potentiometer 212. By increasing the energy during the plasma portion P, or tailout, controlled by potentiometer 222, it has been found that the short circuit operated arc welder of the prior art can be used for welding high nickel wallpaper to produce the method of the present invention.

In the past, the resistance of potentiometer 222 would merely insert approximately 0.08 megohms into parallel circuit including capacitor C. This produced a time constant RC equal to about 0.0002, so that the current would decrease from the peak current toward the background current at a rapid rate which would produce approximately ⅓ of the current after 0.20 ms. This is shown in curve 300 of FIG. 8. The current in the prior arc welders would decrease from a peak of about 300 amperes to a background of about 70 amperes in substantially less than 2 ms. The current would decrease to approximately ⅓ of this difference by about 0.2 ms. Consequently, in the prior arc welders the current would decrease from the peak level to the background level in less than 25% of the time between the plasma boost pulse PB and the short at time T0. In other words, the current would decrease to the background current within ¼ of the time required for the cycle to progress from T4 to the short condition T0. In the preferred embodiment of the invention, with a high nickel wire of 0.045 diameter this time is about 8 ms. There are about 60–80 cycles per second. Curve 300 decreases to the background current within about 1.0 ms. This is substantially less than 2 ms. It was found that without modifications and adjustments this prior arc welder could not function to weld seams 20, 22 of the wallpaper alloy sheets 12, 14, as shown in FIGS. 1–3. To increase the heat in the welding cycle, the prior units required an increase in the background current by changing potentiometer 212. This adjustment was not successful to provide a method for welding wallpaper alloy. This adjustment to the welding process distorted the thin alloy sheets. In order to convert the prior short circuit arc welder to provide a method for welding wallpaper alloy, the welder was modified to allow a large tailout, as shown in curve 302 of FIG. 8. This change was made by increasing the magnitude of the resistance in potentiometer 222 so that a large resistance could be inserted in tailout control 220, either in a fixed manner or an adjusted manner.

Figure 8:
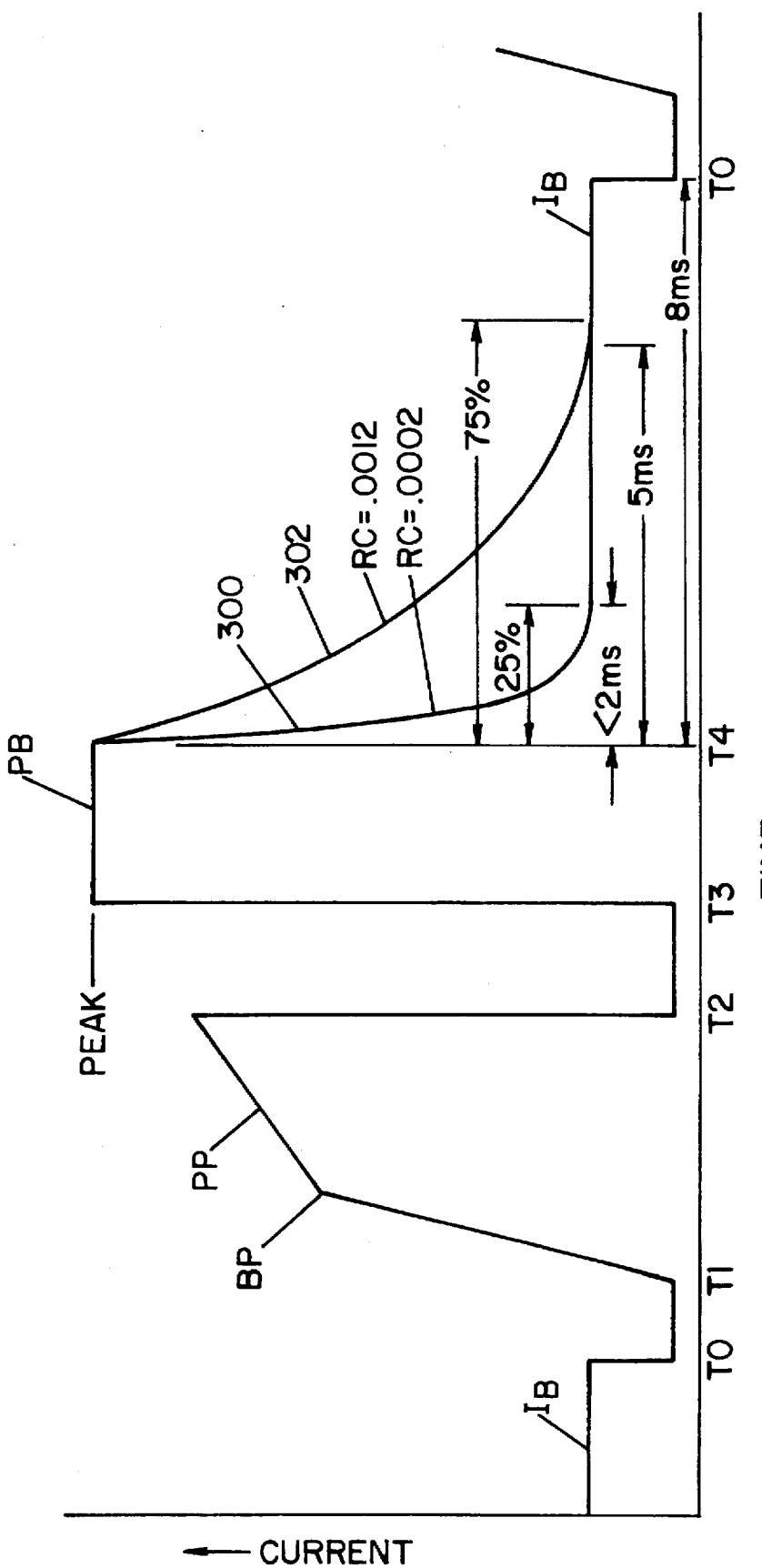
FIG. 8 is a current graph, similar to the graph shown in FIG. 7, illustrating the difference between the welding method of the present invention and the welding method of the prior art.

Referring now to curve 302 in FIG. 8, this curve has a RC of 0.0012. Consequently, the tailout current decreases ⅔ of the difference between the peak current and the background current in 1.2 ms. After 4 ms, the current depicted by curve 302 is nearly at the background current level. By using this drastically increased amount of energy during the plasma portion P, the arc welder A is capable of welding the high nickel wallpaper alloy to the inner surface of scrubber 10. In the preferred embodiment of the invention, the current of curve 302 reaches the background current after approximately 5 ms. The time between T4 and the short condition T0 is approximately 8 ms. Thus, the present invention anticipates a tailout, down slope or plasma portion for the current pulse P, shown in Stava U.S. Pat. No. 5,001,326 which drastically increases the time when the background current is reached. This time is more than 25% of the time T4–T0 and preferably less than about 75% of this given time. Drastic increase in the tailout portion P of the arcing condition in the welding cycle results in a substantial increase in the heat input without the heating of the workpiece. By using this novel concept of drastically increasing the tailout instead of slightly increasing the slope of the decay from the maximum current to the minimum current, it is possible to provide the improved method of the present invention.

Figure 9:
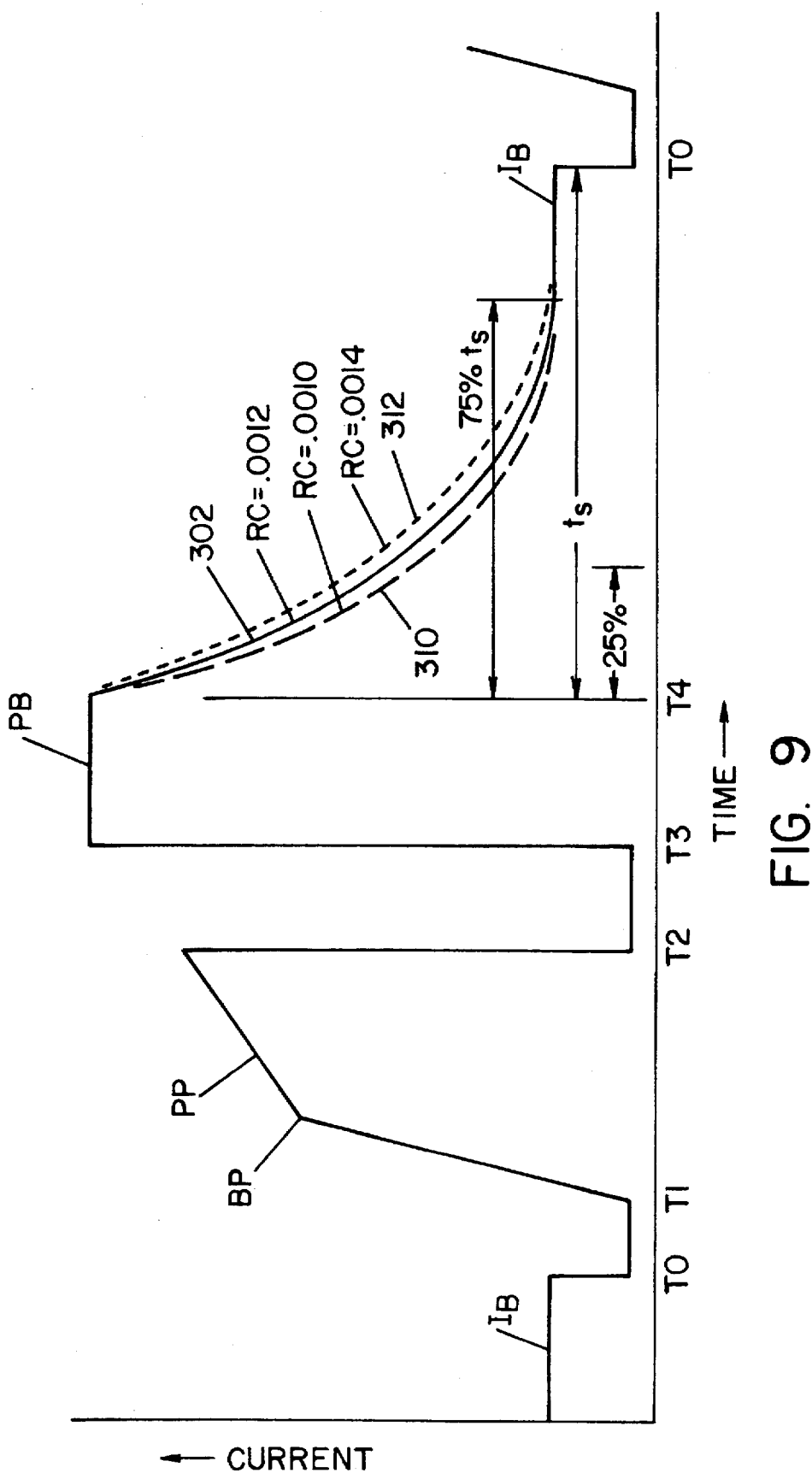
FIG. 9 is a voltage graph, similar to FIG. 8, showing further characteristics defining the present invention.

This inventive concept is also explained by reference to the current graph illustrated in FIG. 9, wherein the time $t_s$ is the time between T4 and the short condition T0. The preferred current curve 302 wherein potentiometer 222 is set to 0.4375 megohms, reduces the current to the background current within less than 5 ms using 0.045 diameter wire. Curve 310 illustrates that a slight decrease in the resistance of potentiometer 222 will reduce the time necessary for the current to decay to the background current. The RC value is reduced to 0.0010. After about 3 ms, the current is near the background current. By increasing the resistance of potentiometer 222, the tailout current follows curve 312. This current curve has an RC value of 0.0014 and requires between 5 ms and 6 ms for the current to decay to the background current. This time is approximately 75% of time $t_s$. Consequently, it has been found that the present invention involves increasing the resistance to increase the tailout curve to a value which allows a drastic increase in the time and, thus, the energy during tailout or plasma portion P of the current cycle shown in FIG. 7.

Referring now to FIG. 10, a modification of the preferred embodiment of the present invention is illustrated where the same elements of FIG. 6 bear the same numbers. Arc welder B includes a tailout or down slope circuit 320 for controlling the discharge of capacitor C by way of transistor 322 and resistor 324. The voltage on line 330 from microprocessor 340 determines the effective resistance in parallel with capacitor C. In this manner, the resistance is controlled by the conductivity of transistor 322. Microprocessor 340 receives sensed parameters of welder B, such as current from switch 182 and voltage from switch 342. The primary control for the voltage on line 330 is the output of previously discussed potentiometer 222, which is shown as controlling the voltage on input line 344 directed to microprocessor 340. Apparatus B has a feedback for regulating the tailout of the current pulse in accordance with a sensed parameter. The curves as shown in FIGS. 8 and 9 are adjusted by potentiometer 222, as previously described. To maintain a selected current curve in a manner controlled by a parameter of the welding operation, the voltage on line 330 is modified according to the feedback from the welding operation. In this manner, a sensed parameter adjusts the effective resistance of circuit 320 to regulate the tailout curve in accordance with the sensed parameter. This sensed parameter could be the current or voltage as illustrated. In addition, the parameter could be watts or joules. Irrespective of the sensed parameter or condition, the effective resistance and, thus, the time constant RC is regulated according to the dynamic characteristics of the welding operation. FIG. 10 shows a modification of the preferred embodiment of the invention that allows feedback control of tailout portion P during the operation of welder B.

FIG. 11 illustrates potentiometer 222 being manually adjusted by an exposed knob 350. The knob adjusts the resistance of potentiometer 222 from a minimum level, which would be the prior art, to a maximum level used in practicing the present invention. The output of the potentiometer 222 is illustrated as line 352. As shown in FIG. 12, knob 350 is mounted on face plate 362 of the housing 360 for welder B. In the past, such welder included a control knob 370 for adjusting the peak current displayed digitally at readout 372. In addition, the background current in the prior units was adjusted by knob 380 and displayed in readout 382. In accordance with the present invention, knob 350 on face plate 362 is adjusted in increments or positions 1–9. In practice, the position No. 7 produces a current following curve 302, shown in FIG. 8. Control circuit 220 has a RC value with a resistor having a resistance of 0.435 megohms.

Having thus defined the invention, the following is claimed:

1. A method of welding a corrosion resistant, wallpaper alloy to the inside surface of a vessel wall formed from a corrosion susceptible steel sheet after said wallpaper alloy has been affixed to said inside to provide an exposed seam of said wallpaper alloy extending in a given path, said method comprising the steps of:

(a) moving a welding wire toward said seam and along said path;

(b) melting and depositing said welding wire onto said seam along said path by a short circuit arc welding process of the type having a welding cycle with a short condition and an arcing condition, which arcing condition constitutes a plasma boost portion with a set peak current level followed by a plasma portion with a current decreasing from said peak current level toward a set background current level with a given time between said plasma boost portion and said short condition of said welding cycle; and, (c) setting the length of time of said plasma portion of said arcing condition to a value greater than 25% of said given time.

2. A method as defined in claim 1 wherein said seam is an overlap between two sections of said wallpaper alloy.

3. A method as defined in claim 1 wherein said seam is between said wallpaper alloy and said steel sheet.

4. A method as defined in claim 1 wherein said decreasing current decreases from said plasma boost in a RC time constant curve.

5. A method as defined in claim 4 wherein said resistance creating said RC time constant is adjustable.

6. A method as defined in claim 5 including the additional steps of:

(d) sensing a parameter in said arc welding process; and, (e) adjusting said resistance in accordance with said sensed parameter.

7. A method as defined in claim 6 wherein said parameter is arc current.

8. A method as defined in claim 6 wherein said parameter is arc voltage.

9. A method as defined in claim 6 wherein said parameter is watts.

10. A method as defined in claim 6 wherein said parameter is joules.

11. A method as defined in claim 1 wherein said value of said length of time is less than about 75% said given time.

12. A method as defined in claim 11 wherein said seam is an overlap between two sections of said wallpaper alloy.

13. A method as defined in claim 11 wherein said seam is between said wallpaper alloy and said steel sheet.

14. A method as defined in claim 11 wherein said decreasing current decreases from said plasma boost in a RC time constant curve.

15. A method as defined in claim 14 wherein said resistance creating said RC time constant is adjustable.

16. A method as defined in claim 1 wherein said value of said length of time is greater than about 2.0 ms.

17. A method as defined in claim 16 wherein said seam is an overlap between two sections of said wallpaper alloy.

18. A method as defined in claim 16 wherein said seam is between said wallpaper alloy and said steel sheet.

19. A method as defined in claim 16 wherein said decreasing current decreases from said plasma boost in a RC time constant curve.

20. A method as defined in claim 1 wherein said wallpaper alloy is a high nickel alloy.

21. A method as defined in claim 1 wherein said wallpaper alloy is a high nickel alloy with at least about 10% chromium and at least about 10% molybdenum.

22. An electric arc welder constructed to perform the method defined in claim 1.

23. A method of controlling the heat generated in a short circuit arc welding process of the type having a welding cycle with a short condition and an arcing condition, which arcing condition constitutes a plasma boost portion with a set peak current level, followed by a plasma portion with a decreasing current and at a set background current level with a given time between said plasma boost portion and said short condition of said welding cycle, said method comprising the steps of:
 (a) reducing said decreasing current along an RC time constant curve from said peak current level to said background current level during said arcing condition wherein said decreasing current reaches said background current or said short condition; and,
 (b) adjusting said time constant curve to an RC where said selected time is at least 25% of said given time to control the generated heat of said welding cycle.

24. A method as defined in claim 23 including the steps of:
 (c) sensing a parameter of said welding process; and,
 (d) adjusting said RC of said time constant curve in accordance with the value of said sensed parameter.

25. A method as defined in claim 23 including the additional steps of:
 (c) adjusting said background current level.

26. A method as defined in claim 25 including the additional steps of:
 (c) using a potentiometer for adjusting said RC of said time constant curve; and,
 (d) manually moving said potentiometer by an exposed knob.

27. A method as defined in claim 23 including the additional steps of:
 (c) using a potentiometer for adjusting said RC of said time constant curve; and,
 (d) manually moving said potentiometer by an exposed knob.

28. A method as defined in claim 23 wherein said welding cycle is created by switching a large number of individual current pulses at a given rate.

29. A method as defined in claim 28 wherein said given rate is in the range of 10–25 KHz.

30. A method as defined in claim 29 wherein said seam is an overlap between two sections of said wallpaper alloy.

31. A method of controlling the heat generated in a short circuit arc welding process of the type having a welding cycle with a short condition and an arcing condition, which arcing condition constitutes a plasma boost portion with a set peak current level, followed by a plasma portion with a decreasing current and a set background current level with a given time between said plasma boost portion and said short condition of said welding cycle, said method comprising the steps of:
 (a) reducing said decreasing current along an RC time constant curve from said peak current level to said background current level during said arcing condition; and,
 (b) adjusting said RC of said time constant curve to control the time of the plasma portion of said welding cycle to a value greater than about 25% of said given time.

32. A method as defined in claim 31 wherein said value is greater than about 75% of said given time.

33. A method as defined in claim 31 wherein said plasma portion is terminated by said short condition before said decreasing current reaches said background current level.

34. A method as defined in claim 31 including the steps of sensing a parameter of said welding process and adjusting said RC of said time constant curve in accordance with the value of said sensed parameter.

35. A method as defined in claim 31 including the additional steps of:
 (c) adjusting said background current level.

36. A method as defined in claim 31 including the additional steps of:
 (c) using a potentiometer for adjusting said time constant curve; and,
 (d) manually moving said potentiometer by an exposed knob.

37. In a short circuit arc welding apparatus comprising a D.C. power supply means for causing a welding current of different levels to pass through a welding wire and a workpiece at a molten metal pool on said workpiece, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, and means for creating plasma boost portion with a set peak current level, means for creating a plasma portion following said plasma boost portion and having a decreasing current level, and means for creating a set background current level, said plasma boost portion, plasma portion and a portion of said background current constituting said arcing condition, the improvement comprising: a capacitor, means for charging said capacitor to a voltage level representative of said peak current level, a resistor with a resistance value to discharge said capacitor in an RC time constant relationship toward a voltage level representative of said background current, means for controlling the curve of said decreasing current during said plasma portion from said peak current level to said background current level by the voltage on said capacitor and an exposed means on said welder for manually adjusting said resistance value of said resistor to adjust the heat created during said plasma portion.

38. The improvement as defined in claim 37 wherein said apparatus includes a housing with a face plate and said resistor adjusting means includes a manually operated knob on said face plate.

39. The improvement as defined in claim 37 wherein said resistor adjusting means includes potentiometer and an exposed knob for adjusting said potentiometer.

40. The improvement as defined in claim 37 wherein said power supply comprises means for switching a large number of individual current pulses at a given rate to form said plasma boost portion and said plasma portion.

41. The improvement as defined in claim 40 wherein said given rate is in the range of 10–25 KHz.

42. A method of welding a corrosion resistant, wallpaper alloy to the inside surface of a vessel wall formed from a corrosion susceptible steel sheet after said wallpaper alloy has been affixed to said inside to provide an exposed seam of said wallpaper alloy extending in a given path, said method comprising the steps of:

(a) moving a welding wire toward said seam and along said path;

(b) melting and depositing said welding wire onto said seam along said path by a short circuit arc welding process of the type having a welding cycle with a short condition and an arcing condition, which arcing condition constitutes a plasma boost portion with a peak current level followed by a plasma portion with a current decreasing from said peak current level toward a set background current level with a given time between said plasma boost portion and said short condition of said welding cycle; and, (c) setting the length of time of said plasma portion of said arcing condition to a value greater than 2.0 ms.

43. A method as defined in claim 42 wherein said seam is an overlap between two sections of said wallpaper alloy.

44. A method as defined in claim 43 wherein said wallpaper alloy is a high nickel alloy.

45. A method as defined in claim 42 wherein said seam is between said wallpaper alloy and said steel sheet.

46. A method as defined in claim 45 wherein said wallpaper alloy is a high nickel alloy.

47. A method as defined in claim 42 wherein said decreasing current decreases from said plasma boost in a RC time constant curve.

48. A method as defined in claim 47 wherein said resistance creating said RC time constant is adjustable.

49. A method as defined in claim 47 wherein said wallpaper alloy is a high nickel alloy.

50. A method as defined in claim 42 wherein said length of time is greater than 4.0 ms.

51. A method as defined in claim 42 wherein said wallpaper alloy is a high nickel alloy.

52. A method as defined in claim 51 wherein said high nickel alloy includes at least about 10% chromium and 10% molybdenum.

53. A method of welding a corrosion resistant, wallpaper alloy to the inside surface of a vessel wall formed from a corrosion susceptible steel sheet after said wallpaper alloy has been affixed to said inside to provide an exposed seam of said wallpaper alloy extending in a given path, said method comprising the steps of:

(a) moving a welding wire toward said seam and along said path;

(b) melting and depositing said welding wire onto said seam along said path by a short circuit arc welding process of the type having a welding cycle with a short condition and an arcing condition, which arcing condition constitutes a plasma boost portion with a set peak current level followed by a plasma portion with a current decreasing from said peak current level toward a set background current level with a given time between said plasma boost portion and said short condition of said welding cycle; and, (c) increasing the heat energy of said cycle by increasing the length of time of said plasma portion of said arcing condition for a given background current level.

54. A method as defined in claim 53 wherein said seam is an overlap between two sections of said wallpaper alloy.

55. A method as defined in claim 53 wherein said seam is between said wallpaper alloy and said steel sheet.

56. A method as defined in claim 53 wherein said decreasing current decreases from said plasma boost in a RC time constant curve.

57. A method of welding a high nickel corrosion resistant, wallpaper alloy to the inside surface of a vessel wall formed from a corrosion susceptible steel sheet after said high nickel wallpaper alloy has been affixed to said inside to provide an exposed seam of said wallpaper alloy extending in a given path, said method comprising the steps of:

(a) moving a welding wire toward said seam and along said path;

(b) melting and depositing said welding wire onto said seam along said path by a short circuit arc welding process of the type having a welding cycle with a short condition and an arcing condition, which arcing condition constitutes a plasma boost portion with a set peak current level followed by a plasma portion with a current decreasing from said peak current level toward a set background current level with a given time between said plasma boost portion and said short condition of said welding cycle; and, (c) causing said decreasing current to decrease from said plasma boost in a RC time constant curve.

58. A method as defined in claim 57, wherein said resistance creating said RC time constant is adjustable.

* * * * *